United States Patent
Joensen et al.

(10) Patent No.: US 12,055,257 B2
(45) Date of Patent: Aug. 6, 2024

(54) SUBSEA INFRASTRUCTURE AND METHOD OF DECOMMISSIONING SUBSEA INFRASTRUCTURE

(71) Applicant: Subsea 7 Limited, Sutton (GB)

(72) Inventors: Arnbjorn Joensen, Aberdeen (GB); Nwabueze Samuel Ogbodo, Kingseat Newmachar (GB); Shona Margaret Manson, Inverurie (GB); Emma Claire Taylor, Aberdeen (GB); Dwayne Hewitt Hopkins, Paradise (CA); John Joseph Ryan, Scarborough (AU)

(73) Assignee: SUBSEA 7 LIMITED, Sutton (GB)

( * ) Notice: Subject to any disclaimer, the term of this patent is extended or adjusted under 35 U.S.C. 154(b) by 225 days.

(21) Appl. No.: 17/551,122

(22) Filed: Dec. 14, 2021

(65) Prior Publication Data
US 2022/0356978 A1    Nov. 10, 2022

(30) Foreign Application Priority Data

Dec. 14, 2020   (GB) ...................... 2019703

(51) Int. Cl.
*F16L 1/16*   (2006.01)
*F16L 1/24*   (2006.01)
*F16L 55/07*  (2006.01)

(52) U.S. Cl.
CPC ............... *F16L 55/07* (2013.01); *F16L 1/166* (2013.01); *F16L 1/24* (2013.01)

(58) Field of Classification Search
CPC . F16L 1/166; F16L 55/07; F16L 1/163; F16L 1/16
See application file for complete search history.

(56) References Cited

U.S. PATENT DOCUMENTS 8,235,628 B2 * 8/2012 Lamison ............... F16L 1/203
                                                    138/26
10,174,865 B2   1/2019 Goodlad et al.
(Continued)

FOREIGN PATENT DOCUMENTS

GB       2 201 220        8/1988
WO    WO 2012/146911    11/2012
(Continued)

*Primary Examiner* — Sean D Andrish
(74) *Attorney, Agent, or Firm* — MATTINGLY & MALUR, PC

(57) ABSTRACT

A method of dewatering a subsea pipeline bundle assembly before lifting the assembly from the seabed and an elongate carrier pipe comprising at least one internal fall that slopes downwardly towards a drainage outlet and at least one venturi formation that is aligned with the drainage outlet. The method comprises adding discrete buoyancy to the elongate carrier pipe that elevates the carrier pipe disposed between drainage outlets of the assembly. Each elevated portion defines inclined falls that slope downwardly in opposed longitudinal directions toward the respective outlets. Water within the carrier pipe drains down the falls toward the outlets. Injecting a dewatering fluid into the carrier pipe promotes expulsion of water from the pipe through the outlets by downward displacement of the water. Drainage may be assisted by a venturi effect driven by accelerating the flow of the dewatering fluid at a location in line with an outlet.

35 Claims, 10 Drawing Sheets

(56) References Cited

U.S. PATENT DOCUMENTS

| | | |
|---|---|---|
| 10,753,509 B2 | 8/2020 | Landwehr |
| 2002/0129641 A1 | 9/2002 | Tucker et al. |
| 2018/0135777 A1 | 5/2018 | Routeau et al. |
| 2018/0354835 A1* | 12/2018 | Lewis .................. B01F 25/103 |

FOREIGN PATENT DOCUMENTS

| | | |
|---|---|---|
| WO | WO 2016/001680 | 1/2016 |
| WO | WO 2018/122611 | 7/2018 |

* cited by examiner

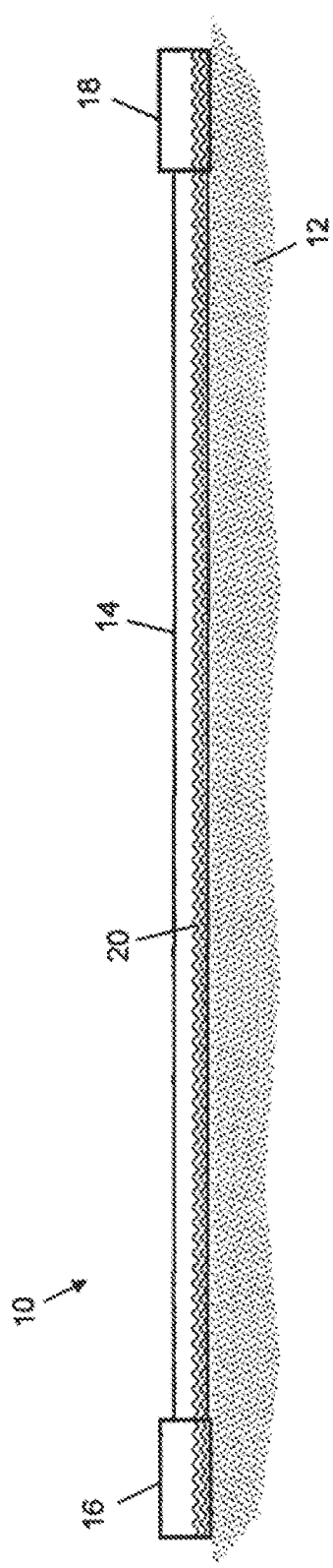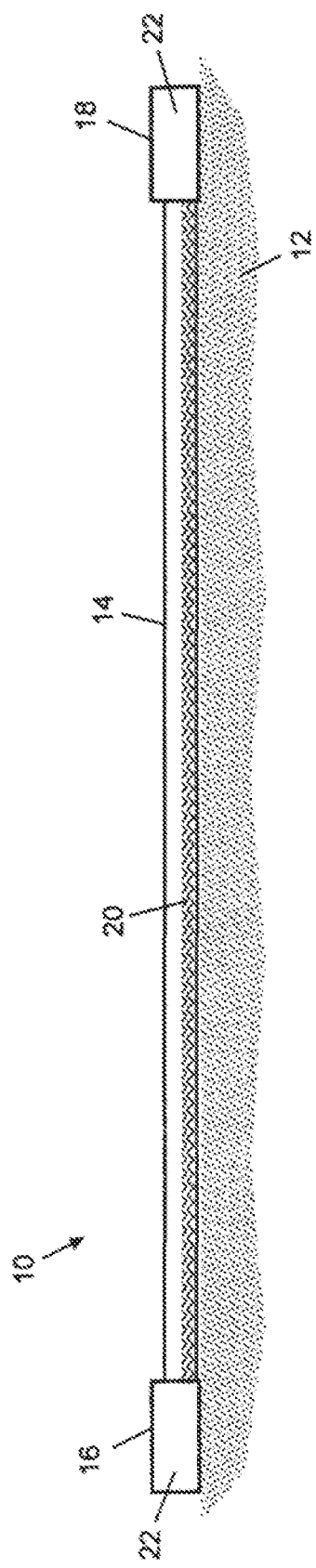

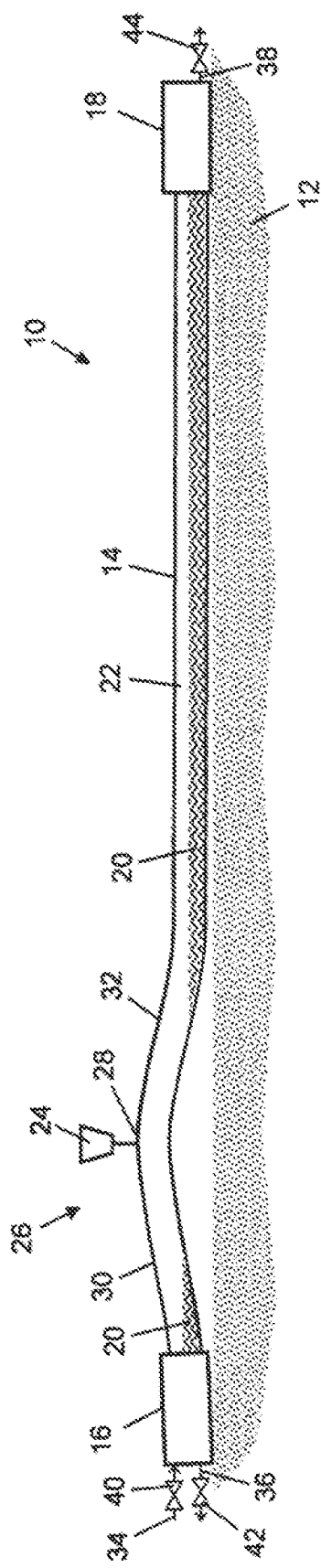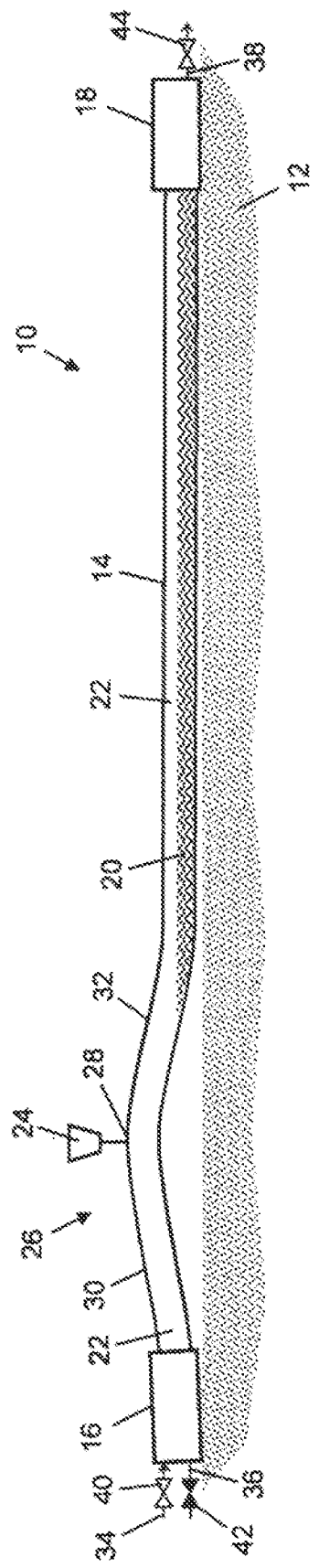

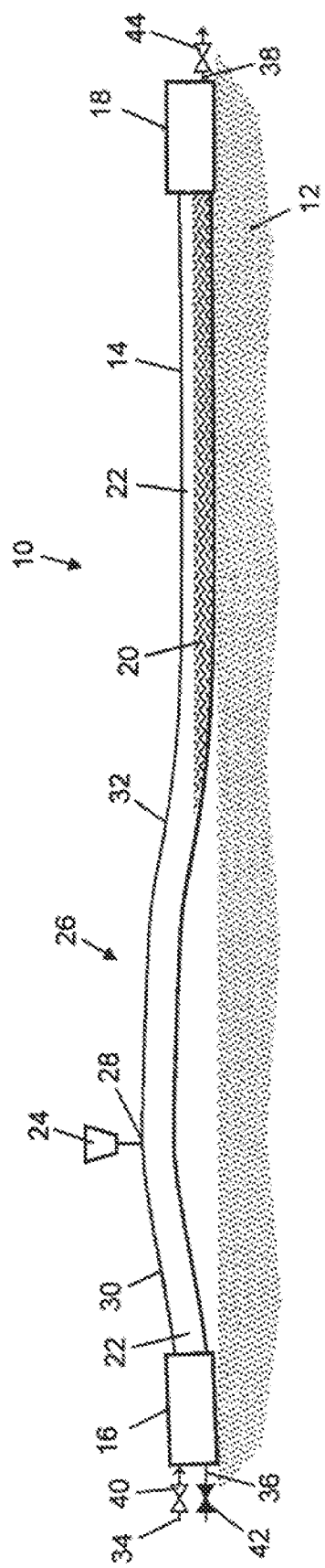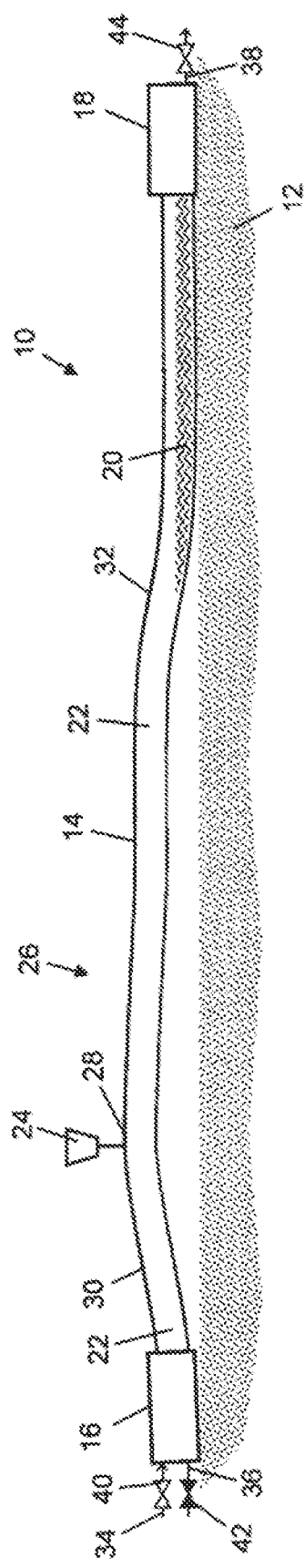

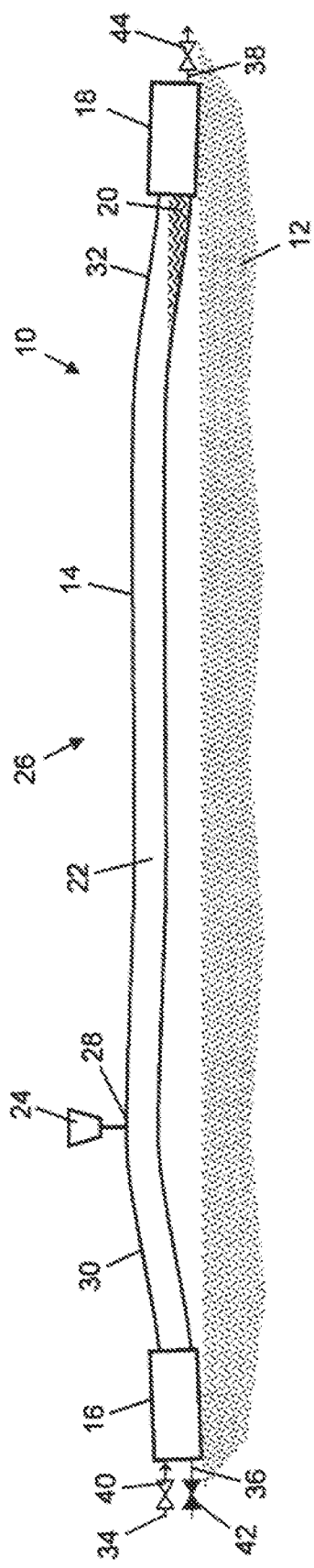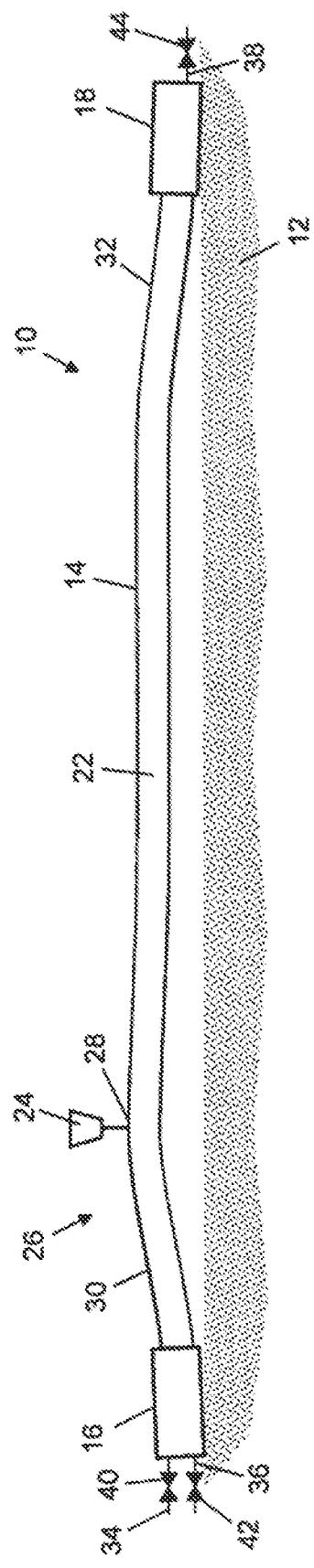

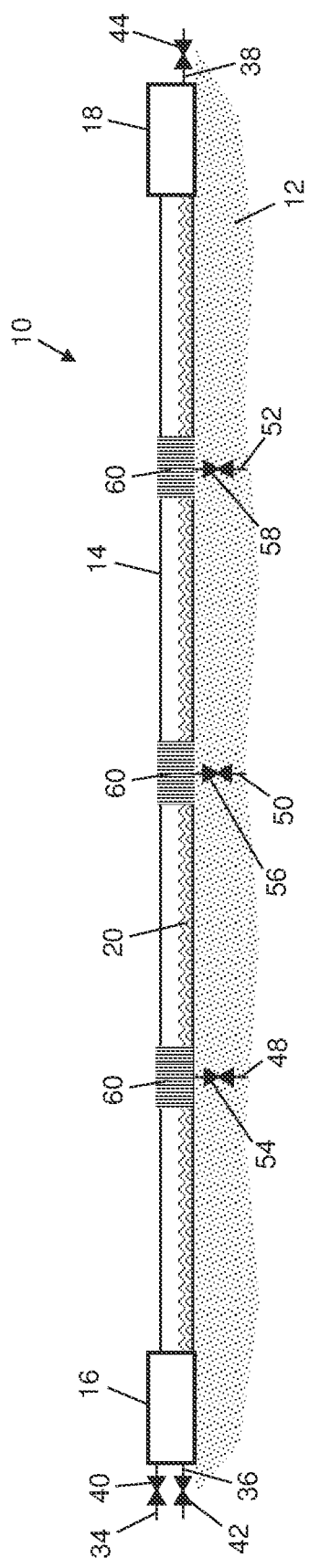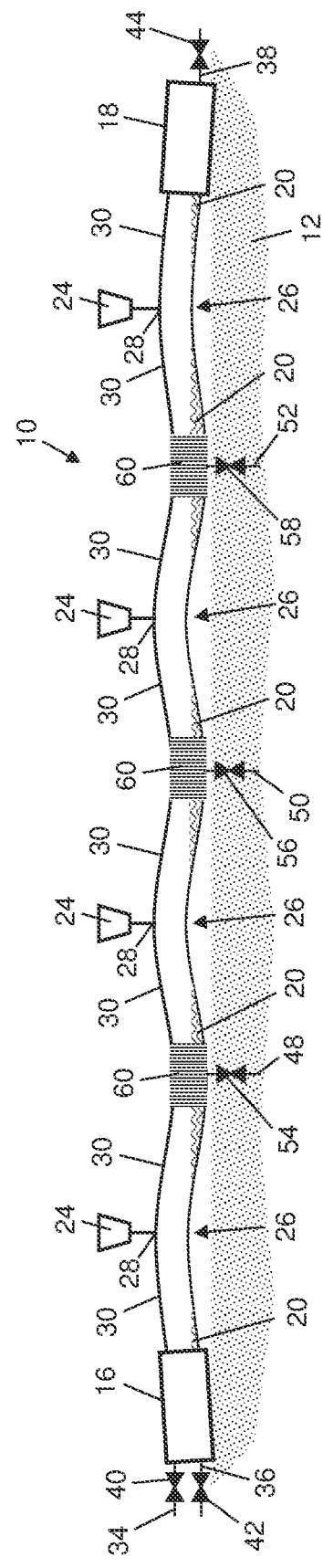
Figure 2a
Figure 2b

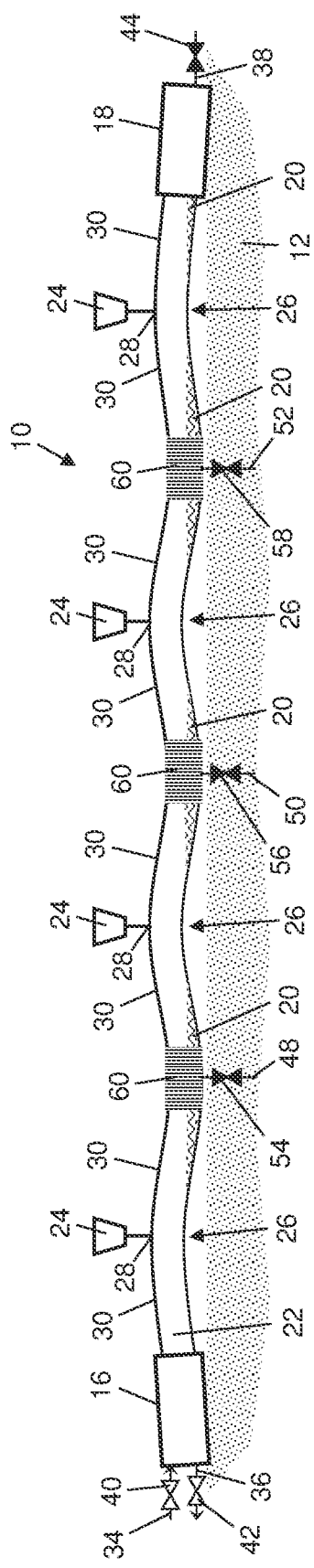
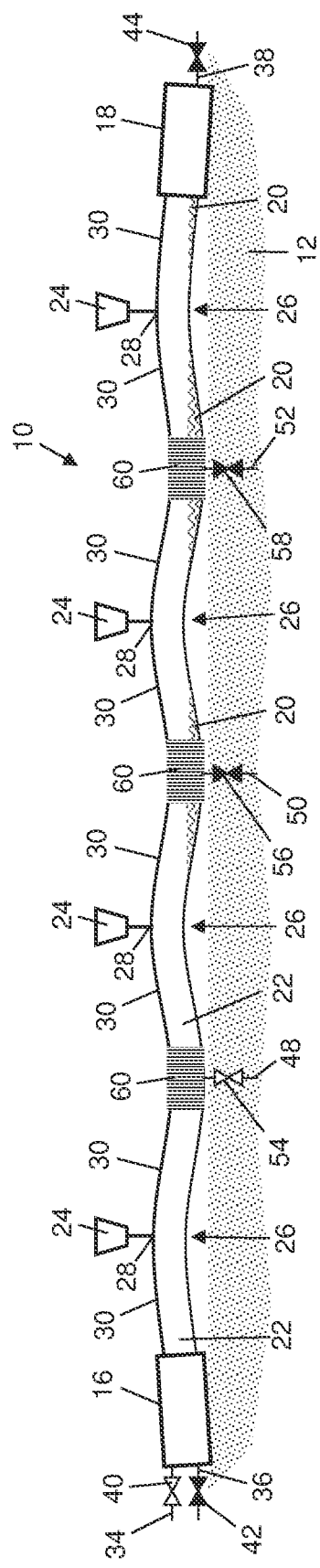
Figure 2c
Figure 2d

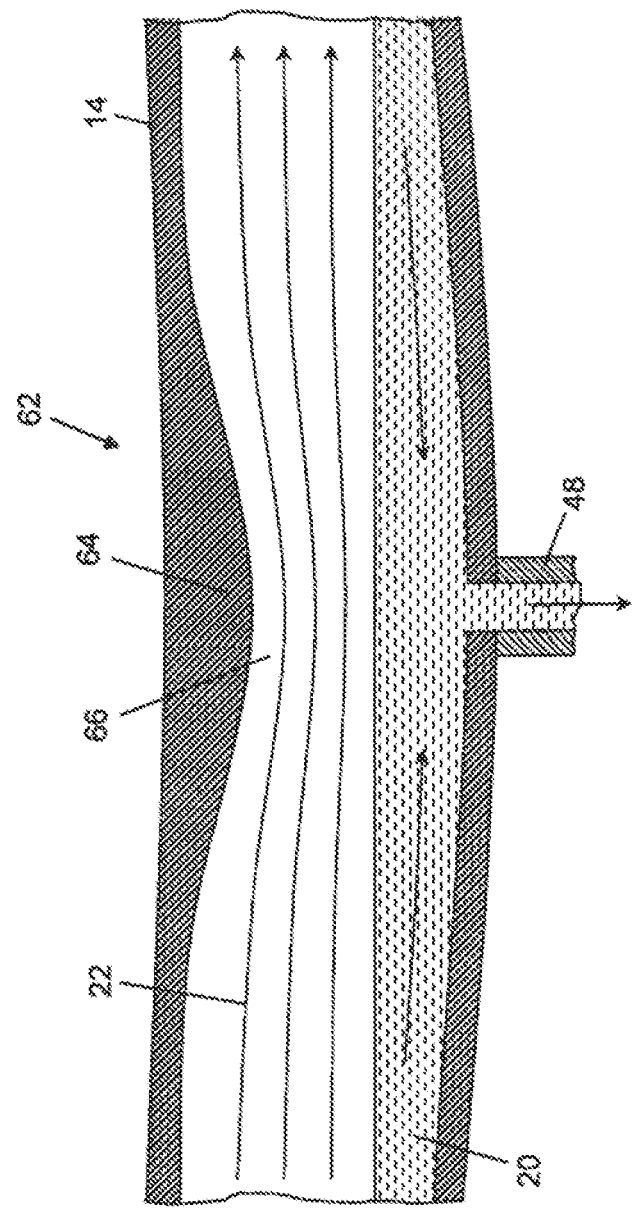

SUBSEA INFRASTRUCTURE AND METHOD OF DECOMMISSIONING SUBSEA INFRASTRUCTURE

BACKGROUND OF THE INVENTION

1. Field of the Invention

This invention relates to the challenges of decommissioning subsea infrastructure as used in the subsea oil and gas industry. The invention relates particularly to refloating pipelines, and especially pipeline bundles, from the seabed to be towed away for scrapping or refurbishment.

2. Description of Related Art

In the past, disused pipelines and other old items of subsea infrastructure were typically cleaned up and left on the seabed to corrode in situ. Now, however, environmental standards mandate that such items must be recovered from the seabed after decommissioning.

It is generally straightforward to pull up individual pipelines from the seabed, for example as described in WO 2012/146911. However, it is much less straightforward to raise a pipeline bundle, which comprises pipelines encased within a carrier pipe connected to towheads at the ends. In this respect, a pipeline bundle is extremely heavy, weighing hundreds or thousands of tonnes in total. Also, it may be desirable to refurbish and reuse a pipeline bundle, meaning that care must be taken to avoid over-stressing any part of the bundle during its recovery.

A pipeline bundle is fabricated onshore and then is pulled into the sea. It is installed by towing the bundle to its destination and then sinking it to the seabed, as described in GB 2201220.

Initially, during transport and installation, a pipeline bundle is filled with air and parts of it, particularly the towheads, may also be supported temporarily by buoyancy modules. This facilitates towing to the installation site, for example by mid-water towing using the controlled depth towing method (CDTM) as known in the art. Thus, a pipeline bundle initially has a low weight in water but then the carrier pipe, and usually also the towheads, are flooded with seawater to ballast the bundle and to stabilise the bundle on the seabed. Flooding the carrier pipe may also be advantageous to offset hydrostatic pressure acting on the outside of the carrier pipe.

Whilst the additional apparent weight of the pipeline bundle conferred by ballasting with seawater is an aid to installation and to use of the bundle, that weight is a significant hindrance to eventual lifting and recovery of the bundle. Apart from its massive weight when containing a large volume of seawater, even a relatively small amount of seawater remaining within the carrier pipe could move longitudinally and hence destabilise the bundle during lifting and towing. Substantially complete dewatering of the bundle is therefore beneficial before the bundle is lifted from the seabed, this involving replacing the seawater ballast with a gas or with a liquid that has a lower specific gravity than seawater.

Unfortunately, in view of its internal structures, it tends to be more difficult effectively to purge seawater from a bundle than from a simple pipeline. Some residual water may remain, particularly at low points where the seabed and hence the carrier pipe undulates or is otherwise inclined to some extent.

In WO 2016/001680 and WO 2018/122611, tubes are provided to add buoyancy to a subsea structure, either directly using the tube, or by using the tube to support buoyancy bags. These approaches may facilitate refloating of a pipeline bundle but they require provisions that would lie redundant throughout the long service life of the bundle and would be used only afterwards, and potentially only once.

U.S. Pat. No. 4,075,862 discloses a method of installing an underwater pipeline in which the pipeline is dragged down to the seabed by hauldown cables. The pipeline is provided with an array of buoys, which remain in place as the pipeline is being winched downwards.

US 2002/129641 discloses a method of completing pipeline commissioning by dewatering the pipeline on the seabed, using pumps either powered or carried by a subsea vehicle.

US 2018/135777 discloses a device for filling a pipe being laid in water. The pipe is filled first with water to stabilise the pipe on the seabed during the laying operation, with a process fluid then injected into the water as a biocide or anti-corrosion agent. A venturi pump may be used to pump the process fluid into the water.

BRIEF SUMMARY OF THE INVENTION

Against this background, the invention resides in a method of dewatering a subsea pipeline bundle assembly at a seabed location. The method comprises: adding discrete buoyancy to an elongate carrier pipe of the assembly to elevate a portion of the carrier pipe disposed between drainage outlets of the assembly, the elevated portion defining inclined falls that slope downwardly in opposed longitudinal directions toward the respective outlets; draining water within the carrier pipe down the falls toward the outlets; and injecting a dewatering fluid into the carrier pipe to promote expulsion of the water from the pipe through the outlets. At least one of the outlets may, for example, be hot-tapped into the carrier pipe underwater.

Where the assembly comprises at least one towhead at an end of the carrier pipe, at least one of the outlets may be located at the or each towhead. There may be a preliminary step of reducing the apparent weight of the or each towhead, for example by dewatering the or each towhead to reduce its apparent weight while maintaining negative buoyancy in the or each towhead. At least one of the falls suitably extends to and adjoins at least one towhead. Thus, after reducing its apparent weight, that towhead may be tilted about a horizontal axis by applying a pivoting moment to the towhead from the elevated portion of the carrier pipe.

The elevated portion may be extended along the carrier pipe by continuing injection of the dewatering fluid into the carrier pipe, hence migrating at least one of the falls along the carrier pipe.

After expelling, through a first outlet, the water drained by one of the falls, the first outlet may be closed. Then, injection of the dewatering fluid into the carrier pipe may continue so as to expel, through a second outlet, the water drained by the other of the falls. Nevertheless, water may be expelled through the first and second outlets simultaneously before the first outlet is closed.

The discrete buoyancy may be added to the carrier pipe at a position offset longitudinally toward one end of the carrier pipe, substantially closer to one end of the carrier pipe then to an opposite end of the carrier pipe.

Elevation of the carrier pipe may be restrained at one or more locations along its length, for example by placing at least one weight on the carrier pipe at the or each of those locations. Elevation of the carrier pipe may also be restrained at opposed ends of the carrier pipe by virtue of the apparent weight of towheads at those ends. Discrete buoyancy may be added to the carrier pipe at two or more positions spaced along the carrier pipe, in which case elevation of the carrier pipe may be restrained between those positions.

The outlets preferably coincide with low-point locations at which elevation of the carrier pipe is restrained. Water may be expelled through those outlets in longitudinal succession. Each outlet may be closed in longitudinal succession after the water stops being expelled through that outlet.

The dewatering fluid may conveniently be injected from one end of the assembly and may eventually confer positive buoyancy on the carrier pipe.

The added buoyancy is preferably released from the carrier pipe after dewatering the assembly and before lifting the assembly from the seabed location. The assembly may be lifted from the seabed location suspended between lines that connect respective ends of the assembly to respective surface vessels.

Elegantly, water may be drawn toward at least one of the outlets by a pressure differential that is created by flow of the dewatering fluid within the assembly. For example, the pressure differential may be created in a venturi formation that is aligned with at least one of the outlets.

Correspondingly, the inventive concept embraces a subsea pipeline bundle assembly positioned on the seabed. The assembly comprises: an elongate carrier pipe having a portion elevated from the seabed by discrete buoyancy added to the carrier pipe, the elevated portion being disposed between longitudinally-spaced drainage outlets and defining inclined falls that slope downwardly in opposed longitudinal directions toward the respective outlets; and an inlet for injection of a dewatering fluid into the carrier pipe to promote expulsion of water from the pipe through the outlets.

The discrete buoyancy may be at a position offset longitudinally toward one end of the carrier pipe, substantially closer to one end of the carrier pipe than to an opposite end of the carrier pipe. The discrete buoyancy may also be at two or more positions spaced along the carrier pipe, in which case the carrier pipe may be restrained against elevation from the seabed between those positions. The outlets suitably coincide with low-point locations at which elevation of the carrier pipe is restrained.

At least one venturi formation may be aligned with at least one of the outlets, the venturi formation being in communication with the inlet to receive and accelerate a flow of the dewatering fluid.

Thus, the inventive concept extends to a method of dewatering an elongate subsea structure, the method comprising: directing a flow of dewatering fluid within the structure to a venturi formation; accelerating the flow through the venturi formation to generate a region of low fluid pressure within the structure; drawing water within the structure toward a drainage outlet positioned within the region of low fluid pressure; and expelling the water from the structure through the drainage outlet.

Water may be drawn toward the drainage outlet by a combination of low fluid pressure and gravity.

The flow of dewatering fluid may be directed through the venturi formation above a volume of water that is in alignment with the venturi formation and is in communication with the drainage outlet.

Correspondingly, the inventive concept extends to an elongate subsea structure comprising at least one venturi formation that is aligned with at least one drainage outlet and is in communication with a dewatering fluid inlet to receive and accelerate a flow of a dewatering fluid, that accelerated flow generating a region of low fluid pressure within the structure that is capable of drawing water within the structure toward the drainage outlet.

At least one internal fall may slope downwardly toward the drainage outlet. The or each fall is suitably defined by at least one elevated portion of the structure, which may be supported by external buoyancy attached to the structure, and which may be at a position offset longitudinally toward one end of the structure, substantially closer to one end of the structure than to an opposite end of the structure.

Weights or towheads may restrain elevation of the structure to define low points beside the or each elevated portion. At least one drainage outlet may be in longitudinal alignment with each of the low points.

When dewatering a pipeline and especially a pipeline bundle, it is relatively straightforward to remove most of the water but it is challenging to eliminate all of the water. This invention facilitates removal of as much of that residual water as possible.

Whilst the genesis of the invention lies in the particular challenges of refloating pipeline bundles, aspects of the invention could be applied to recovering individual pipelines or other hollow elongate elements from the seabed.

Embodiments of the invention implement a method to refloat a pipeline bundle laid on the seabed. The method comprises the steps of dewatering towheads of the bundle by injecting a dewatering fluid; adding discrete buoyancy to the bundle between at least two dewatering points to create a slope upwards between the dewatering points and the buoyancy; opening at least one dewatering valve located at a dewatering point; and injecting dewatering fluid through a vent to expel water through the at least one dewatering valve until the bundle is floating. Dewatering typically comprises replacing seawater in the bundle by a less dense dewatering fluid, which may be a liquid such as mineral oil or kerosene or a gas such as air or nitrogen.

The dewatering points may be located at the towheads and/or at intermediate locations along the bundle. Before lift-off, ballast such as chains or other weights may be added at the intermediate locations so as to maintain those locations, and hence the associated dewatering points, as low points of the bundle. The method may further comprise removing the added ballast in turn after the corresponding dewatering valve is closed, which may be before or after other dewatering valves are closed.

The vent for injecting dewatering fluid and/or the dewatering points may comprise a suction pump such as a venturi or may be connected to a branch of a suction pump. The vent for injecting dewatering fluid may be located at one or both of the towheads.

Venturis generate different pressures at different points along their funnel geometry. In an aspect of the invention, this pressure difference may be used to create a suction pump to draw out water from within a pipeline or carrier pipe, thereby to accelerate the dewatering process. In principle, it would be beneficial to use venturi devices in series and/or at one or both ends of a pipeline or bundle to accelerate the dewatering process yet further.

The dewatering valves are suitably at the bottom of, or beneath, the dewatering points. The dewatering valves may be opened and closed in sequence to dewater all sections of the bundle successively, for example in longitudinal succession.

Conveniently, vents or inlets for injecting dewatering fluid and ports that define the dewatering points may be created underwater by hot-tapping methods when the bundle has reached the end of its service life.

In summary, the invention contemplates dewatering a subsea pipeline bundle assembly before lifting the assembly from the seabed. Discrete buoyancy is added to an elongate carrier pipe of the assembly. That buoyancy elevates one or more portions of the carrier pipe disposed between drainage outlets of the assembly. Each elevated portion defines inclined falls that slope downwardly in opposed longitudinal directions toward the respective outlets. Water within the carrier pipe drains down the falls toward the outlets.

Injecting a dewatering fluid into the carrier pipe promotes expulsion of water from the pipe through the outlets by downward displacement of the water. Drainage may be assisted by a venturi effect driven by accelerating the flow of the dewatering fluid at a location in line with an outlet.

The method of the invention is very different to a mere reversal of the conventional sequence of lowering and ballasting an item of subsea infrastructure. The sequence of the method enables the slope of the carrier pipe to be controlled and for variations in longitudinal curvature to remain smooth to respect the maximum bending moment of the carrier pipe.

In order that the invention may be more readily understood, reference will now be made, by way of example, to the accompanying drawings, in which:

BRIEF DESCRIPTION OF THE DRAWINGS

FIG. 1A is a sequence of schematic side view that shows a pipeline bundle being dewatered in accordance with a method of the invention, before being lifted from the seabed;

FIG. 16 is a sequence of schematic side view of the invention;

FIG. 1C is a sequence of schematic side view of the invention;

FIG. 1D is a sequence of schematic side view of the invention;

FIG. 1E is a sequence of schematic side view of the invention;

FIG. 1F is a sequence of schematic side view of the invention;

FIG. 1G is a sequence of schematic side view of the invention;

FIG. 1H is a sequence of schematic side view of the invention:

FIG. 2A is a sequence of schematic side view that shows a pipeline bundle being dewatered in accordance with another method of the invention;

FIG. 2B is a sequence of schematic side view that shows a pipeline bundle of the invention;

FIG. 2C is a sequence of schematic side view that shows a pipeline bundle of the invention;

FIG. 2D is a sequence of schematic side view that shows a pipeline bundle of the invention;

FIG. 3 is an enlarged schematic side view of part of a carrier pipe of a pipeline bundle in longitudinal section, showing an internal venturi profile in accordance with the invention, coincident with a drainage outlet of the carrier pipe.

DETAILED DESCRIPTION OF THE INVENTION

Figure 1I:
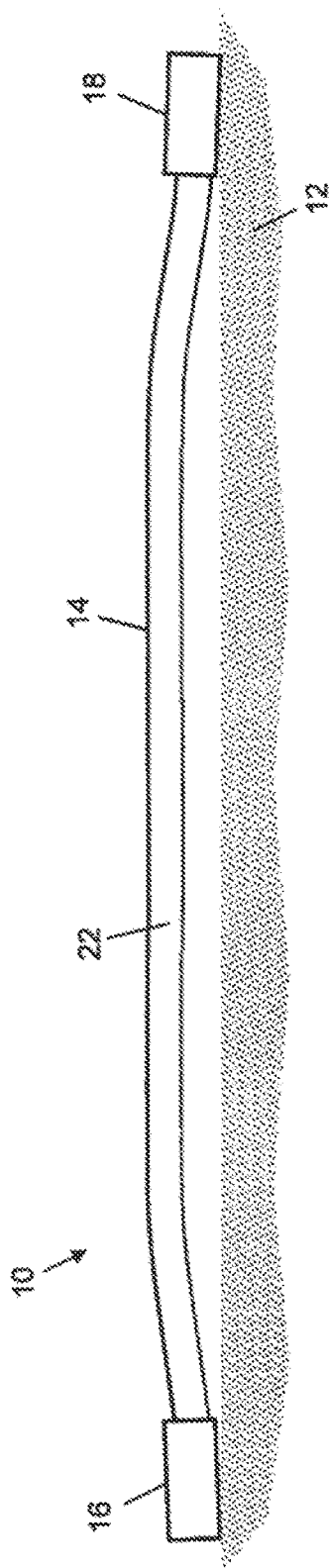
FIG. 1I is a sequence of schematic side view of the invention.

Referring firstly to FIGS. 1A to 1J, these drawings show a decommissioned pipeline bundle assembly 10 initially tying on the seabed 12 and then being lifted from the seabed 12 to be towed away. In this example, the bundle assembly 10 comprises a carrier pipe 14 that terminates in towheads 16, 18 at its respective ends.

Conventionally, the carrier pipe 14 will contain various parallel elongate elements extending between the towheads 16, 18, including flowlines, service fluid lines and cables, all typically supported by longitudinally-distributed spacers. Such elements and spacers have been omitted from the drawings for simplicity.

Initially, as shown in FIG. 1A, the carrier pipe 14 and the towheads 16, 18 contain residual seawater 20 remaining from installation and use. As explained above, the main purpose of flooding the carrier pipe 14 and the towheads 16, 18 with seawater 20 during installation was to confer negative buoyancy on the bundle assembly 10. At that stage, negative buoyancy distributed along the length of the assembly 10 was necessary to sink the assembly 10 to the seabed 12 after towing to the installation site and thereafter to stabilise the assembly 10 on the seabed 12.

Whilst the additional apparent weight of the assembly 10 conferred by ballasting with seawater 20 is an aid to installation and to use of the assembly 10, that weight is a hindrance to lifting and recovery of the assembly 10. Apart from its weight, even a relatively small amount of seawater 20 remaining within the carrier pipe 14 could move and gather longitudinally and hence destabilise the assembly 10 when the assembly 10 is raised from the seabed 12. Consequently, the invention proposes improved dewatering processes, one of which will now be described with reference to FIGS. 18 to 1I.

FIG. 18 shows that seawater 20 has been displaced from the towheads 16, 18 in a first, optional deballasting stage of the dewatering process. In particular, a dewatering fluid 22 injected into ballasting chambers of the towheads 16, 18, typically at above-ambient pressure, displaces the seawater 20 from the towheads 16. The dewatering fluid 22 may be a gas such as air or nitrogen or a liquid such as mineral oil or kerosene. Injection and drainage ports and related valves on the towheads 16, 18 have been omitted from FIGS. 1A and 1B for simplicity.

Being substantially less dense than the displaced seawater 20, the injected dewatering fluid 22 reduces the apparent weight of the towheads 16, 18. In principle, it could be possible to confer positive buoyancy on the towheads 16, 18 in this way. However, it is preferred for the towheads 16, 18 to remain slightly negatively buoyant, or at most of substantially neutral buoyancy, so as to maintain control of their position and orientation and to avoid inadvertently overstressing the carrier pipe 14. In this example, the apparent weight of the towheads 16, 18 is reduced to about ten tonnes. As the remaining figures will show, reducing the apparent weight of the towheads 16, 18 in this way allows the towheads 16, 18 to tilt more readily about a transverse horizontal axis as the carrier pipe 14 is deballasted and as the assembly 10 is lifted from the seabed 12.

In FIG. 1C, a buoyancy module 24, which in this example exerts three tonnes of upthrust, has been attached to the carrier pipe 14 at an intermediate location between the towheads 16, 18. In principle, the buoyancy module 24 could be attached to the carrier pipe 14 at any point along its length but in this preferred example, the buoyancy module 24 is offset longitudinally toward one end of the carrier pipe 14. The buoyancy module 24 is therefore substantially closer to one of the towheads 16 than to the other towhead 18.

In consequence of the transverse point loading applied to the carrier pipe 14 by the buoyant upthrust of the buoyancy module 24, a portion 26 of the carrier pipe 14 beneath and adjacent to the buoyancy module 24 is lifted slightly from the seabed 12. The extent of uplift of the carrier pipe 14 is exaggerated in this schematic view. The elevated portion 26 of the carrier pipe 14 adopts upwardly-convex longitudinal curvature while the remainder of the carrier pipe 14 remains on and level with the seabed 12, hence remaining substantially horizontal.

Points of inflection in the longitudinal curvature of the carrier pipe 14 are thereby defined at the upper apex 28 of the elevated portion 26, directly beneath the buoyancy module 24, and at the ends of that portion 26 where the carrier pipe 14 returns to the level of the remainder of the carrier pipe 14 on the seabed 12.

It will be apparent from FIG. 1C that the elevated portion 28 of the carrier pipe 14 defines locally-Inclined or tilted sections or fails 30, 32 that extend from the apex 28 with downward inclination in opposite longitudinal directions. It will also be apparent that the deballasted towhead 16 closer to the buoyancy module 24 can tilt to complement the inclination of the adjoining fall 30. This mitigates stress in the carrier pipe 14 adjoining that towhead 16.

In consequence of the inclination of the falls 30, 32 in the carrier pipe 14 imparted by the upthrust of the buoyancy module 24, gravity causes seawater 20 in the elevated portion 26 of the carrier pipe 14 to drain away from the apex 28 in opposite longitudinal directions toward the towheads 16, 18.

In this respect, FIG. 1C also shows fluid ducts 34, 36, 38 that communicate with the interior of the carrier pipe 14. In this case, the ducts 34, 36, 38 are shown on the towheads 16, 18 and so communicate with the carrier pipe 14 through the towheads 16, 18 but corresponding ducts could instead be positioned directly on the carrier pipe 14. Specifically, the ducts 34, 36, 38 comprise an inlet duct 34 and a drainage duct 38 on the towhead 18 closer to the buoyancy module 24 and an additional drainage duct 38 on the towhead 18 further from the buoyancy module 24.

Fluid flow in the ducts 34, 38, 38 is controlled by respective valves 40, 42, 44. As is conventional, the valves 40, 42, 44 are represented in the drawings as white when open and as black when closed.

When its valve 40 is open as shown in FIG. 1C, the inlet duct 34 admits dewatering fluid 22 into the interior of the carrier pipe 14 to displace the seawater 20 and hence to increase the buoyancy of the carrier pipe 14. Potentially, deballasting can continue to the extent of imparting positive or substantially neutral buoyancy to the carrier pipe 14, as will be described.

When their valves 42, 44 are open as shown in FIG. 1C, the drainage ducts 36, 38 remove seawater 20 that drains away from the elevated portion 26 of the carrier pipe 14 under the influence of gravity and displacement by the dewatering fluid 22. Outward flow of seawater 20 through the drainage ducts 36, 38 could be assisted by external suction pumps but such pumps have been omitted from the drawings. Similarly, a pump for driving inward flow of dewatering fluid 22 through the inlet duct 34 has been omitted from the drawings.

Soon, substantially all of the water 20 in the fall 30 that extends from the apex 28 to the closer towhead 16 drains out of the carrier pipe 14 through the drainage duct 36 associated with that towhead 16. This is confirmed when dewatering fluid 22, still entering the carrier pipe 14 through the inlet duct 34, begins to emerge from that drainage duct 36. Then, the valve 42 of the drainage duct 36 is closed as shown in FIG. 10 to prevent further loss of the dewatering fluid 22. This preserves and increases the volume and pressure, and hence the displacing effect, of the dewatering fluid 22 on the seawater 20 remaining in the remainder of the carrier pipe 14, including the other fab 32 that extends from the apex 28 toward the further towhead 18.

As dewatering fluid 22 continues to flow into the carrier pipe 14 through the inlet duct 34 as shown in FIGS. 1E to 1G, seawater 20 continues to be displaced and expelled from the carrier pipe 14 through the drainage duct 38 of the opposite towhead 18. In this respect, it will be noted that the valve 44 of the drainage duct 38 remains open throughout the drainage process.

It will also be apparent that ongoing displacement of denser seawater 20 with less dense dewatering fluid 22 makes the carrier pipe 14 progressively more buoyant. Moreover, as low-density dewatering fluid 22 accumulates in the elevated portion 26 and the volume of the injected dewatering fluid 22 continues to increase, the elevated portion 26 will tend to grow and extend.

In this respect, FIGS. 1E to 1G show that the increasing buoyancy of the carrier pipe 14 is manifested by the elevated portion 26 lengthening progressively toward the towhead 18, as seawater 20 drains down the fall 32 and along the remaining horizontal part of the carrier pipe 14 toward the drainage duct 38 of the towhead 18. In effect, therefore, the fall 32 migrates along the carrier pipe 14 toward the towhead 18. Beneficially, therefore, longitudinally-successive portions of the carrier pipe 14 are inclined or tilted transiently as the fall 32 at the leading end of the lengthening elevated portion 26 migrates through them. This exploits gravity to promote drainage of water from all parts of the carrier pipe 14, without over-bending and over-stressing the carrier pipe 14 at any stage.

Eventually, as shown in FIG. 1G, the fall 32 migrates to adjoin the towhead 18. Beneficially, as with the other towhead 16 and the other fall 30, the deballasted towhead 18 can tilt readily to complement the inclination of the fall 32, which reduces stress in the carrier pipe 14 where it adjoins that towhead 18.

The valves 40, 44 in the inlet duct 34 of the towhead 16 and the drainage duct 38 of the other towhead 18 remain open until substantially all of the seawater 20 has drained out of the carrier pipe 14. At that point, the dewatering fluid 22 will begin to emerge from the drainage duct 38, whereupon the valves 40, 44 in the inlet duct 34 and the drainage duct 38 are closed as shown in FIG. 1H.

Figure 1J:
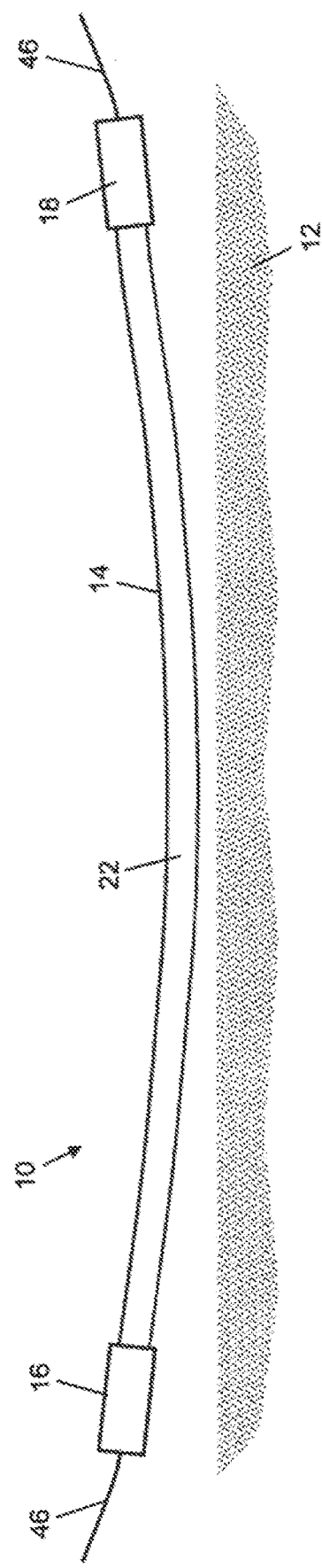
FIG. 1J is a sequence of schematic side view of the invention.

Next, as shown in FIG. 1I, the buoyancy module 24 is removed from the carrier pipe 14. This balances buoyancy forces along the length of the bundle assembly 10. The bundle assembly 10 can then be lifted from the seabed as shown in FIG. 1J, for example by tension in wires 48 attached to the towheads 18, 18 and extending to tugs (not shown) at the surface. The tugs can then tow the bundle assembly 10 between them at the surface or at a mid-water depth, for example using the controlled depth towing method (CDTM).

Turning next to FIGS. 2A to 2H, these drawings illustrate another dewatering method of the invention that may be particularly appropriate where the bundle assembly 10 is to be refurbished and reused. In that case, close control of the curvature of the carrier pipe 14 is important, as is substantially complete dewatering to ensure stability when the bundle assembly 10 is being towed away from the installation site. Like numerals are used for like features.

Again, a decommissioned bundle assembly 10 is shown initially lying on the seabed 12 before being lifted from the seabed 12 to be towed away. The bundle assembly 10 comprises a carrier pipe 14 that terminates in towheads 16, 18 at its respective ends. The towheads 16, 18 shown in FIG. 2A have already been deballasted in a manner skin to that shown in FIG. 1B.

An inlet duct 34 and a drainage duct 36 are shown on the towhead 16 and an additional drainage duct 38 is shown on the opposite towhead 18. Fluid flow in the ducts 34, 36, 38 is controlled by respective valves 40, 42, 44.

Here, the carrier pipe 14 has at least one further drainage duct at an intermediate location along its length. The or each drainage duct may, for example, be formed underwater by hot-tapping an opening through the tubular wall of the carrier pipe 14. In this case, a series of drainage ducts 48, 50, 52 are distributed along the carrier pipe 14 in a longitudinally-spaced array. In this example, there is substantially equal longitudinal spacing between the ducts 48, 50, 52.

Outward flow of seawater 20 through the drainage ducts 48, 50, 52 is controlled by respective valves 54, 56, 58. Again, that flow could be assisted by suction pumps. It would also be possible to connect the ducts 48, 50, 52 to a common manifold, which could be connected to a single suction pump. However, such provisions have been omitted from the drawings.

Clump weights 60, such as ten-tonne chain saddles, are placed on the carrier pipe 14 at positions corresponding to the drainage ducts 48, 50, 52 as shown in FIG. 2A.

Next, as shown in FIG. 28, buoyancy modules 24 are attached to the carrier pipe 14 at locations midway between the clump weights 60 and midway between the outermost clump weights 60 and the towheads 16, 18. Thus, the buoyancy modules 24 alternate longitudinally with the clump weights 60 and the towheads 16, 18, which restrain elevation of the carrier pipe 14 between and outboard of the buoyancy modules 24.

In consequence of the buoyant upthrust of the buoyancy modules 24, portions 26 of the carrier pipe 14 beneath and adjacent to each buoyancy module 24 are lifted slightly from the seabed 12 as shown. Each elevated portion 26 of the carrier pipe 14 therefore adopts upwardly-convex longitudinal curvature and so defines falls 30 that extend from respective apices 28 with downward inclination in opposite longitudinal directions.

In consequence of the inclination of the falls 30 in the carrier pipe 14 imparted by the upthrust of the buoyancy modules 24, gravity causes seawater 20 in the elevated portions 26 of the carrier pipe 14 to drain away from the apices 28 in opposite longitudinal directions. This causes the seawater 20 to gather at the various low points of the carrier pipe 14. The bundle assembly 10 may be left in this state for a period sufficient for gravity to draw seawater 20 toward the low points of the carrier pipe 14 before drainage begins.

Low points at the ends of the carrier pipe 14 are defined where the carrier pipe 14 adjoins the towheads 16, 18. Beneficially, as before, the deballasted towheads 16, 18 can tilt to complement the inclination of the falls 30, which reduces stress in the carrier pipe 14 where it adjoins the towheads 16, 18. Additional intermediate low points of the carrier pipe 14 are defined by the clump weights 60 and so are coincident with the drainage ducts 48, 50, 52.

In this way, seawater 20 can be evacuated effectively from the carrier pipe 14 through the drainage ducts 36, 38 of the towheads 16, 18 and the drainage ducts 48, 50, 52 of the carrier pipe 14. In principle, drainage could be done simultaneously from two or more of those ducts 36, 38, 48, 50, 52, for example symmetrically about the longitudinal midpoint of the bundle assembly 10, or simultaneously from respective sides of that midpoint in inward or outward succession. However, FIGS. 2C to 2H show the option of sequential drainage from successive ducts in turn, in the order 36, 48, 50, 52, 38 along the length of the bundle assembly 10 from end to end.

Figure 2E:
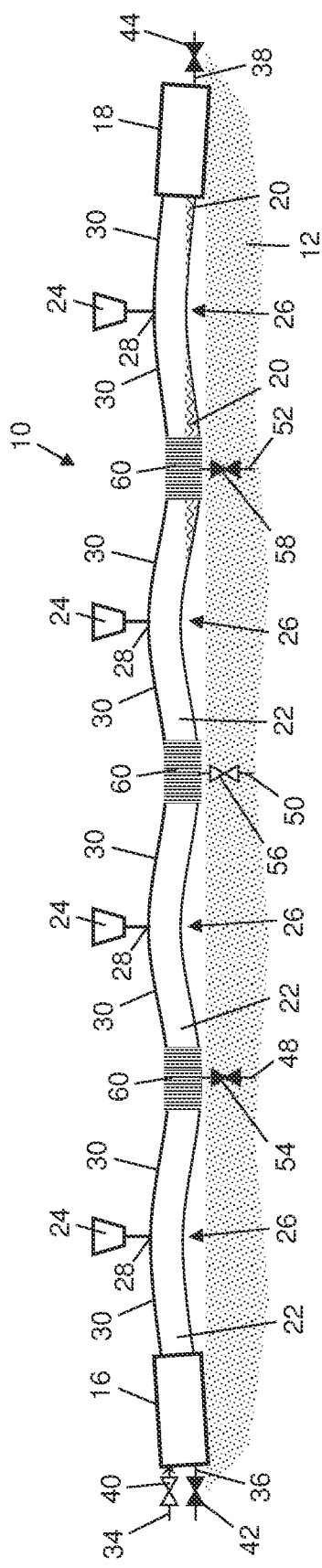
FIG. 2E is a sequence of schematic side view that shows a pipeline bundle of the invention.

In each of FIGS. 2C to 2G, the valve 40 of the inlet duct 34 of the towhead 16 remains open to admit dewatering fluid 22 into the bundle assembly 10 at elevated, slightly above-ambient pressure. FIG. 2C shows the valve 42 of the drainage duct 36 of the towhead 16 also open. Conversely, the valve 44 of the drainage duct 38 of the other towhead 18 and the valves 54, 56, 58 of the drainage ducts 48, 50, 52 of the carrier pipe 14 all remain closed. Dewatering fluid 22 is admitted into the carrier pipe 14 through the inlet duct 34 to promote drainage of the seawater 20 from the fail 30 adjacent to the towhead 16 and out through the drainage duct 36.

FIG. 2D shows the valve 54 of the drainage duct 48 of the carrier pipe 14 now open. The valves 42, 44 of the drainage ducts 36, 38 of the towheads 16, 18 and the valves 56, 58 of the other drainage ducts 50, 52 of the carrier pipe 14 are closed. Dewatering fluid 22 admitted into the carrier pipe 14 through the inlet duct 34 promotes drainage of the seawater 20 from the falls 30 that converge on the drainage duct 48 and then out of the carrier pipe 14 through that drainage duct 48.

FIG. 2E shows the valve 56 of the drainage duct 50 of the carrier pipe 14 now open. The valves 42, 44 of the drainage ducts 36, 38 of the towheads 16, 18 and the valves 54, 58 of the other drainage ducts 48, 52 of the carrier pipe 14 are closed. Dewatering fluid 22 admitted into the carrier pipe 14 through the inlet duct 34 promotes drainage of the seawater 20 from the falls 30 that converge on the drainage duct 50 and then out of the carrier pipe 14 through that drainage duct 50.

Figure 2F:
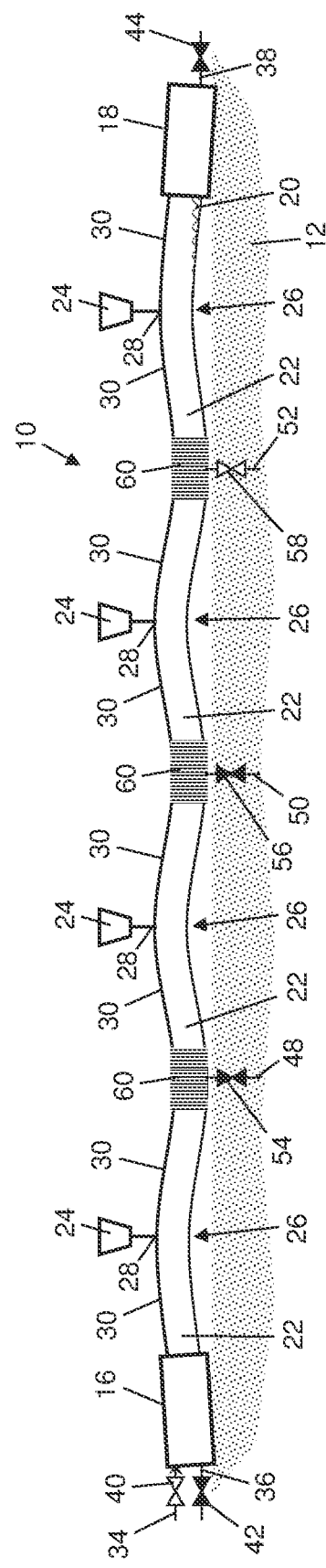
FIG. 2F is a sequence of schematic side view that shows a pipeline bundle of the invention.

FIG. 2F shows the valve 58 of the drainage duct 52 of the carrier pipe 14 now open. The valves 42, 44 of the drainage ducts 36, 38 of the towheads 16, 18 and the valves 54, 58 of the other drainage ducts 48, 50 of the carrier pipe 14 are closed. Dewatering fluid 22 admitted into the carrier pipe 14 through the inlet duct 34 promotes drainage of the seawater 20 from the falls 30 that converge on the drainage duct 52 and then out of the carrier pipe 14 through that drainage duct 52.

Figure 2G:
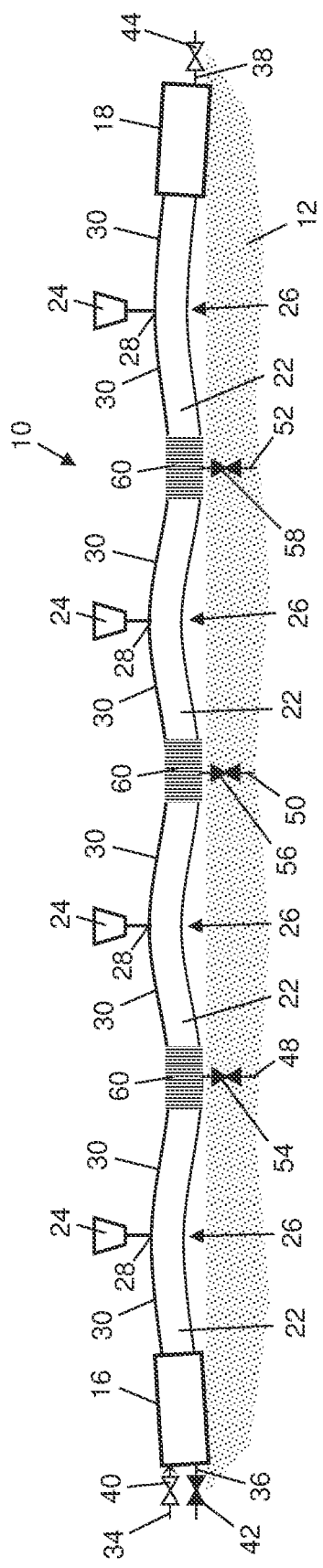
FIG. 2G is a sequence of schematic side view that shows a pipeline bundle of the invention.

FIG. 2G shows the valve 44 of the drainage duct 38 of the towhead 18 now open. Conversely, the valve 42 of the drainage duct 36 of the other towhead 16 and the valves 54, 56, 58 of the drainage ducts 48, 50, 52 of the carrier pipe 14 are all closed. Dewatering fluid 22 admitted into the carrier pipe 14 through the inlet duct 34 promotes drainage of the seawater 20 from the fall 32 adjacent to the towhead 18 and out through the drainage duct 38.

Figure 2H:
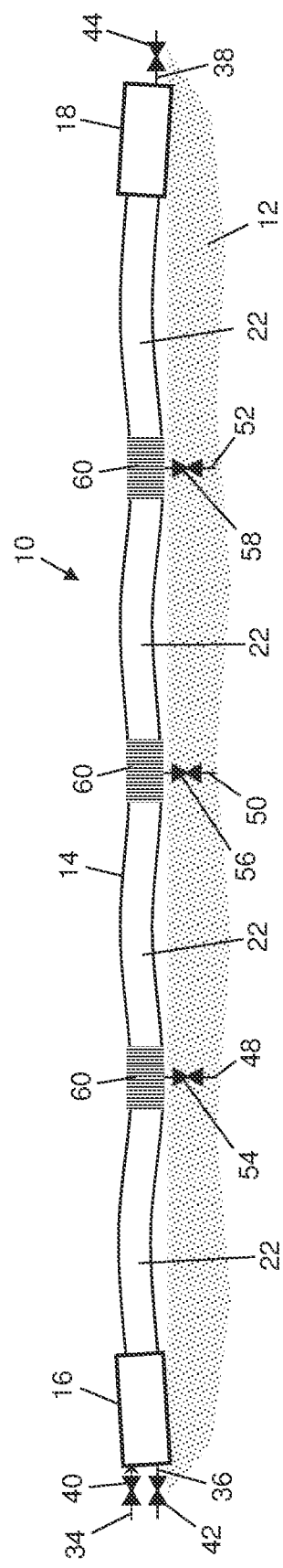
FIG. 2H is a sequence of schematic side view that shows a pipeline bundle of the invention.

When substantially all of the seawater 20 has been expelled from the bundle assembly in this way, the buoyancy modules 24 are detached from the carrier pipe 14 as shown in FIG. 2H. The valves 40, 42, 44 of the towheads 16, 18 and the valves 54, 56, 58 of the carrier pipe 14 are now all closed.

At this stage, the clump weights 60 remain on the carrier pipe 14 but in a subsequent operation, not shown, the clump weights 60 are removed from the carrier pipe 14. For example, the clump weights 60 may be removed in longitudinal sequence or symmetrically about the longitudinal midpoint of the carrier pipe 14, or simultaneously from respective sides of that midpoint in inward or outward succession. This allows the carrier pipe 14 to adopt the upwardly-convex profile along its length shown in FIG. 1I and then for the bundle assembly 10 to be lifted from the seabed 12, for example as shown in FIG. 1J.

Turning finally to FIG. 3 of the drawings, this shows an optional venturi formation 62 of the invention that may be provided within the carrier pipe 14 at a longitudinal position coincident with any or all of the drainage ducts 48, 50, 52. One of those drainage ducts 48 is shown here. Again, internal features of the carrier pipe 14 such as flowlines, other pipes, cables and spacers have been omitted from this drawing.

In this example, the venturi formation 62 comprises a radially-inward bulge 64 on the inner wall of the carrier pipe 14 that defines a narrow throat 66. Dewatering fluid 22 is shown flowing along the carrier pipe 14 above a body of residual seawater 20. On encountering the throat 66, the longitudinal flow of dewatering fluid 22 accelerates. By virtue of Bernoulli's principle, the accelerated flow of dewatering fluid 22 generates a local reduction in fluid pressure in the throat 66. As shown, this locally-reduced fluid pressure draws seawater 20 toward the drainage duct 48 aligned with the throat 66, hence further promoting expulsion of the seawater 20 from the carrier pipe 14.

In the example shown, the bulge 64 that defines the venturi formation 62 is asymmetric, being present in an upper side of the carrier pipe 14 opposed to the drainage duct 48 but being absent in a lower side of the carrier pipe 14 to promote downward drainage. In other embodiments, the bulge 64 could extend around substantially the entire internal circumference of the carrier pipe 14. The bulge 64 could be defined by a local thickening of the wall of the carrier pipe 14, for example by incorporating a suitably-profiled insert piece into or within the carrier pipe 14.

In principle, it would be possible for a venturi formation 62 to coincide with a drainage outlet at any location in the bundle assembly 10, including the drainage ducts 36, 38 of the towheads 16, 18.

Many other variations are possible within the inventive concept. For example, the arrangement shown in FIGS. 1A to 1J could have one or more further drainage ducts at intermediate locations along its length, like those of FIGS. 2A to 2H.

In another variant, the apparent weight of the towheads could be reduced by attaching buoyancy modules to them, in addition to or instead of deballasting by expelling seawater from them.

The sequential order of valve opening, water draining and dewatering fluid injection steps expressed herein is preferred for operational reasons but it could be modified without departing from the inventive concept.

The invention claimed is:

1. A method of dewatering a subsea pipeline bundle assembly at a seabed location comprises:
    adding discrete buoyancy to an elongate carrier pipe of the assembly to elevate a portion of the carrier pipe disposed between drainage outlets of the assembly, the elevated portion defining inclined falls that slope downwardly in opposed longitudinal directions toward the respective outlets;
    draining water within the carrier pipe down the falls toward the outlets; and
    injecting a dewatering fluid into the carrier pipe to promote expulsion of the water from the pipe through the outlets.

2. The method of claim 1, wherein the assembly comprises at least one towhead at an end of the carrier pipe.

3. The method of claim 2, wherein at least one of the outlets is located at the at least one towhead.

4. The method of claim 2, further comprising a preliminary step of reducing apparent weight of the at least one towhead.

5. The method of claim 4, comprising dewatering the at least one towhead to reduce the apparent weight of the at least one towhead.

6. The method of claim 4, comprising maintaining negative buoyancy in the at least one towhead.

7. The method of claim 4, wherein at least one of the falls extends to and adjoins the at least one towhead.

8. The method of claim 7, comprising, after reducing the apparent weight of the at least one towhead, tilting the at least one towhead about a horizontal axis by applying a pivoting moment to the at least one towhead from the elevated portion of the carrier pipe.

9. The method of claim 1, comprising extending the elevated portion along the carrier pipe by continuing injection of the dewatering fluid into the carrier pipe.

10. The method of claim 9, comprising migrating at least one of the falls along the carrier pipe.

11. The method of claim 1, comprising:
    expelling, through a first outlet, the water drained by a first fall of the falls;
    closing the first outlet; and then
    continuing to inject the dewatering fluid into the carrier pipe to expel, through a second outlet, the water drained by a second fall of the falls.

12. The method of claim 11, comprising expelling the water through the first and second outlets simultaneously before closing the first outlet.

13. The method of claim 1, comprising adding the discrete buoyancy to the carrier pipe at a position offset longitudinally toward one end of the carrier pipe, substantially closer to the one end of the carrier pipe than to an opposite end of the carrier pipe.

14. The method of claim 1, comprising restraining elevation of the carrier pipe at one or more locations along a length of the carrier pipe.

15. The method of claim 14, comprising placing at least one weight on the carrier pipe at the or each of said locations.

16. The method of claim 14, comprising restraining elevation of the carrier pipe at opposed ends of the carrier pipe by virtue of towheads at the opposed ends of the carrier pipe.

17. The method of claim 14, comprising adding the discrete buoyancy to the carrier pipe at two or more positions spaced along the carrier pipe, the or each of said locations at which elevation of the carrier pipe is restrained being between said positions at which the discrete buoyancy is added.

18. The method of claim 14, wherein the outlets coincide with said one or more locations at which elevation of the carrier pipe is restrained.

19. The method of claim 18, comprising expelling the water through the outlets in longitudinal succession.

20. The method of claim 18, comprising closing each outlet in longitudinal succession after the water stops being expelled through that outlet.

21. The method of claim 1, comprising injecting the dewatering fluid from one end of the assembly.

22. The method of claim 1, comprising conferring positive buoyancy on the carrier pipe.

23. The method of claim 1, further comprising releasing the added buoyancy from the carrier pipe after dewatering the assembly and before lifting the assembly from the seabed location.

24. The method of claim 1, comprising lifting the assembly from the seabed location suspended between lines that connect respective ends of the assembly to respective surface vessels.

25. The method of claim 1, comprising hot tapping the outlets underwater.

26. The method of claim 1, comprising drawing the water toward at least one of the outlets by a pressure differential created by flow of the dewatering fluid within the assembly.

27. The method of claim 26, comprising creating the pressure differential in a venturi formation that is aligned with at least one of the outlets.

28. A method of dewatering an elongate subsea structure comprises:
    directing a flow of dewatering fluid within the structure to a venturi formation;
    accelerating the flow through the venturi formation to generate a region of low fluid pressure within the structure;
    drawing water within the structure toward a drainage outlet positioned within the region of low fluid pressure by a combination of the low fluid pressure and gravity; and
    expelling the water from the structure through the drainage outlet.

29. The method of claim 28, comprising directing the flow of dewatering fluid through the venturi formation above a volume of water that is in alignment with the venturi formation and is in communication with the drainage outlet.

30. An elongate subsea structure comprises at least one internal fall that slopes downwardly toward at least one drainage outlet and at least one venturi formation that is aligned with the at least one drainage outlet and is in communication with a dewatering fluid inlet to receive and accelerate a flow of a dewatering fluid, wherein the accelerated flow generating generates a region of low fluid pressure within the structure that is capable of drawing water within the structure toward the drainage outlet.

31. The structure of claim 30, wherein the or each fall is defined by at least one elevated portion of the structure.

32. The structure of claim 31, wherein the at least one elevated portion is supported by external buoyancy attached to the structure.

33. The structure of claim 32, wherein the external buoyancy is at a position offset longitudinally toward one end of the structure, substantially closer to the one end of the structure than to an opposite end of the structure.

34. The structure of claim 31, further comprising weights that restrain elevation of the structure to define low points beside the or each elevated portion.

35. The structure of claim 34, wherein at least one drainage outlet is in longitudinal alignment with each of the low points.

* * * * *